Aug. 19, 1969     E. SCHWAB ET AL     3,462,627
ANNULAR ROTOR SUPPORTING STRUCTURE FOR A SYNCHRONOUS MACHINE
Filed Aug. 16, 1966     3 Sheets-Sheet 3
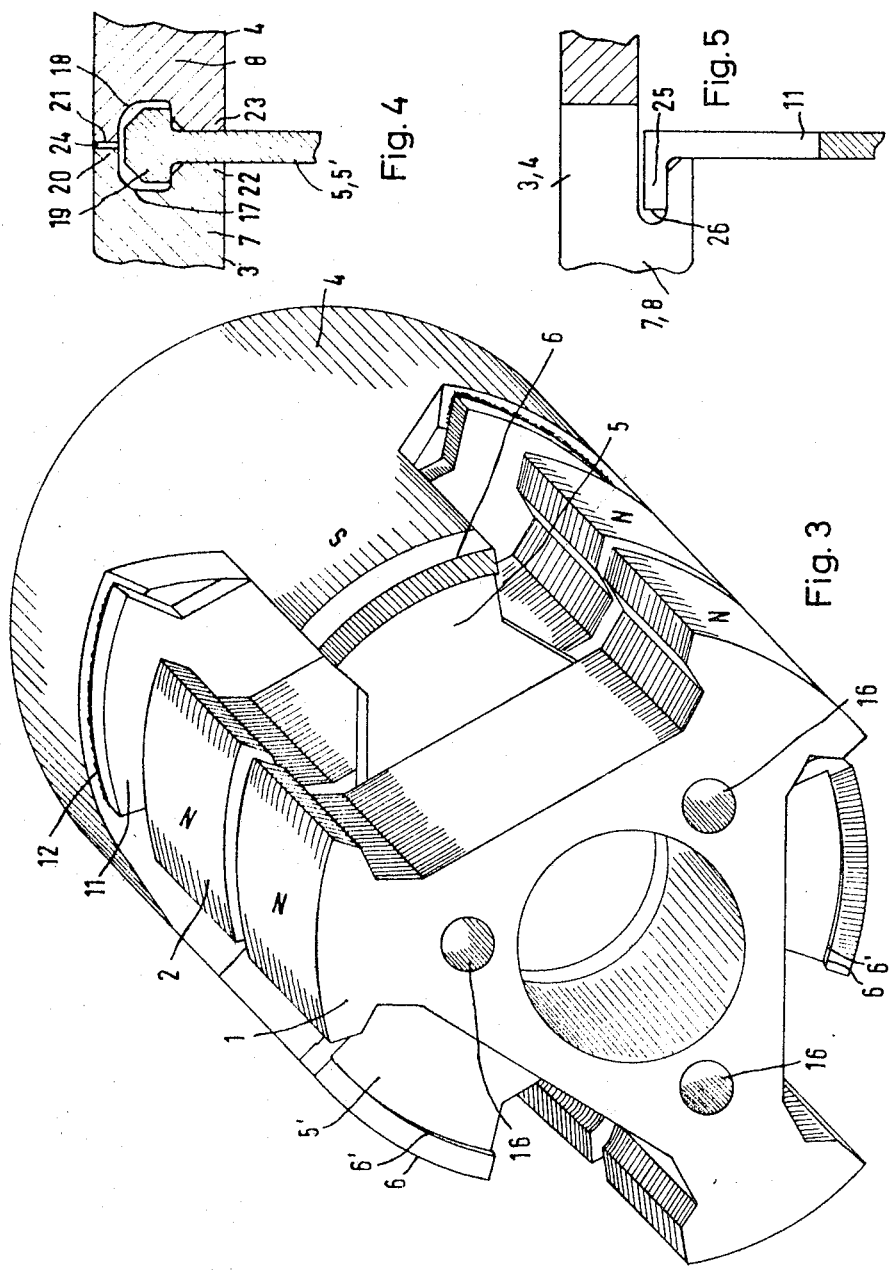

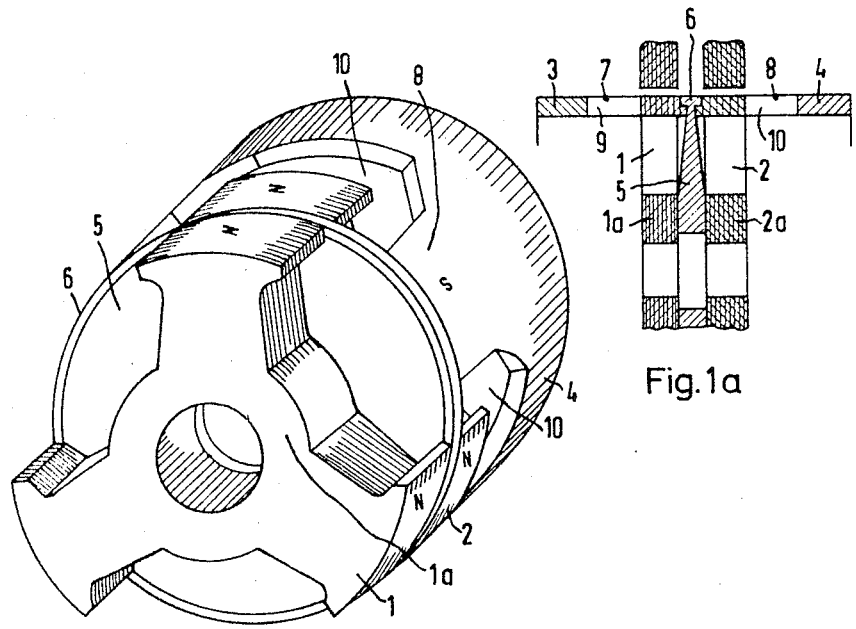
Fig. 1a
Fig. 1b
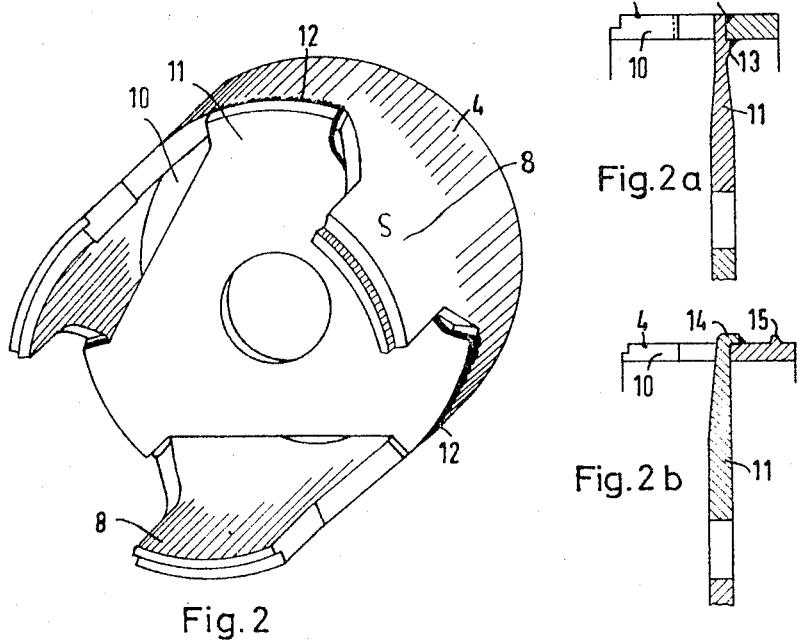
Fig. 2
Fig. 2a
Fig. 2b

United States Patent Office
3,462,627
Patented Aug. 19, 1969

3,462,627
ANNULAR ROTOR SUPPORTING STRUCTURE
FOR A SYNCHRONOUS MACHINE
Erich Schwab, Nuremberg-Eibach, and Theo Birkmann, Nuremberg, Germany, assignors to Siemens Aktiengesellschaft, a corporation of Germany
Filed Aug. 16, 1966, Ser. No. 572,704
Claims priority, application Germany, Aug. 19, 1965,
S 98,915
Int. Cl. H02k 5/00, 21/00, 1/22
U.S. Cl. 310—162          12 Claims

ABSTRACT OF THE DISCLOSURE

An alternating pole, winding-free annular rotor for synchronous machine comprises a winding-free first magnetic pole system of substantially cylindrical configuration positioned around a magnetically conductive shaft and having windows formed through the cylindrical surface thereof. A winding-free second magnetic pole system extends radially relative to the first magnetic pole system and is securely torsion-resistantly affixed to the shaft. The second pole system extends into the windows of the first pole system. A radially extending non-magnetic carrier is torsion-resistantly affixed to the shaft perpendicularly thereto. Each of the first and second pole systems comprises two partial systems specularly positioned relative to the carrier. Each of the two partial systems of the first pole system has axially aligned arms adjacent the windows of the first pole system and boltlessly and centrifugal force-resistantly affixed to the edge of the carrier and to each other.

---

Our invention relates to alternating-current generators of the synchronous type and, more particularly, to a round rotor of the alternating-pole type for such generators.

Alternators with such rotors, having no slip rings, have been used, especially as medium-frequency generators, on aircraft for energizing the on-board power distribution network. The machines, however, have been of limited use only, because of a severe limitation imposed upon their operating speed due to the fact that the rotors heretofore known would not sufficiently withstand the centrifugal forces occurring at higher speeds.

The known synchronous machines of the above-mentioned type have two excitation windings traversed by currents of mutually opposed directions, which windings are arranged in respective stationary ring structures of magnetically conducting material, the two magnetic circuits extending through auxiliary air gaps. The alternator further comprises a rotor assembly composed of two magnet-pole systems of which one is of generally cylindrical shape and has a number of poles of one polarity peripherally spaced from each other so as to form intermediate recesses in which the respective poles of the other polarity, all forming part of a spider-shaped magnet-pole system, are located. The spider-shaped pole system is rigidly joined with the magnetically conducting shaft of the machine or with a magnetically conducting hub seated on the shaft. The cylindrical pole system is connected through non-magnetic fastening means with the same shaft or hub or also with the spider-shaped pole system. Such a rotor possesses a number of north and south poles alternating along the periphery.

In such a synchronous machine the magnetic flux passes through the magnetically good conducting machine shaft or hub to the spider-shaped pole system and leaves the rotor assembly through edge rings after passing through the poles of the cylindrical pole system. Relative to the stationary stack of stator laminations, which carries a single-phase or multi-phase alternating-current winding, the rotor constitutes a magnet system of the alternating-pole type and need not be equipped with any excitation winding.

The mechanical connection of the cylindrical magnet system with the shaft or hub or with the spider-shaped magnet-pole system must be effected by non-magnetic fastening means. It is known for this purpose to connect the cylindrical pole system with the hub or shaft by non-magnetic bolts extending radially between the poles of the spider-shaped pole system.

As mentioned, the rotor assembly of such a machine is suitable only for a limited speed of rotation. This applies also to machines of relatively low power rating and is mainly due to the fact that at higher speeds the centrifugal forces can no longer be fully counteracted by the above-mentioned screw bolts employed for fastening and bracing the two-part rotor assembly. Consequently, an operation above the limit speed would subject the rotor to appreciable departures from the circular shape, particularly in the cylindrical magnet-pole system.

It has been proposed to mount permanent magnets between the two pole systems of the rotor. This, however, is difficult since the permanent magnet must be constructed as hollow bodies so that they can surround the above-mentioned fastening and bracing bolts.

It is, therefore, an object of our invention to provide a synchronous machine of the above-mentioned type, and particularly an alternating-pole rotor for such machines, that is capable of retaining its accurate shape at much higher speeds of rotation than heretofore permissible, thus permitting the use of the machine for generating currents of higher frequencies or for providing a higher power output for given dimensions.

Another object of the invention is to achieve the desired stability as to accurate shape at increased speeds while also affording a simplification in the construction of the synchronous-machine rotor.

Yet another object of the invention is to provide a rotor, as set forth, with supporting members which reinforce the rotor against the effects of centrifugal forces, but do not require an increased axial length of the rotor.

A still further object of the invention is to provide a rotor, as set forth, of weight-saving design, and which results in smaller excitation coils associated with the machine.

To achieve these objects and in accordance with a feature of our invention, the rotor of a synchronous machine generally of the type described above is designed as follows. Each of the two magnet-pole systems of the rotor assembly is subdivided into two component systems or pole pieces, the subdivision being in a plane perpendicular to the rotor axis and hence to the axis of its drive shaft. The two component pieces of each pole system are located on opposite sides of a non-magnetic central supporting member which is fastened on the shaft or hub and non-rotatable relative thereto, and which is rigidly joined with the protruding pole portions of those two component pole pieces that jointly form the cylindrically annular pole system. As a result, the central member braces the poles of the annular system against centrifugal forces.

Synchronous machines with a rotor according to these features of our invention are eminently suitable for the high speeds of rotation desired particularly for on-board power generators of aircraft, since they are able to withstand very high centrifugal forces, for example up to several 1000 kp., while requiring a slight if any axially greater machine length and but a negligible increase in weight.

The above-mentioned and further objects, advantages and features of our invention will be described in, and will be apparent from, the following description of embodiments illustrated by way of example in the accompanying drawings, in which:

FIG. 1a is a fragmentary sectional view of a rotor according to the invention, the section being in a plane through the longitudinal axis of the rotor;

FIG. 1b is an isometric view, showing the structural relationship between the spider pole piece and the annular pole piece of the same rotor, as well as the means for supporting the annular pole piece at the rotor center;

FIG. 2 is an isometric view showing additional supports for the rim edges of the annular pole piece;

FIG. 2a is a partial sectional view in a plane through the longitudinal axis of the rotor, and shows the construction for securing the support of FIG. 2 to the annular pole piece;

FIG. 2b is a partial sectional view similar to that of FIG. 2a but relating to another embodiment for securing the support of FIG. 2 to the annular pole piece;

FIG. 3 is an isometric view of another embodiment for supporting the annular pole piece, as well as reducing the weight of the rotor;

FIG. 4 is a fragementary sectional view in a plane passing through the annular pole piece of the rotor shown in FIG. 3; and FIG. 5 is a fragmentary sectional view of another detail in a plane through the annular pole piece of the rotor shown in FIG. 3.

Figure 3A:
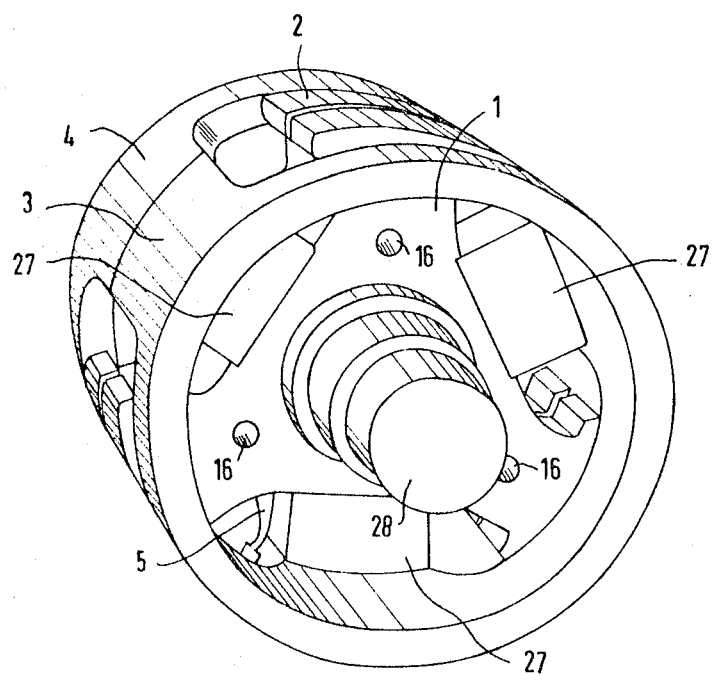
FIG. 3a shows isometrically still another embodiment of a rotor according to the invention.

Referring to the drawing, the rotor of the machine includes Y-shaped or spider-shaped pole pieces 1, 2 which form north poles, and annular pole pieces 3, 4 which form the corresponding south poles. For clearly showing the internal construction of the rotor, the annular pole 3 is omitted from the assembly shown in FIGS. 1b and 3. When properly assembled on the drive shaft of the rotor (28 in FIG. 3a), pole piece 3 is situated directly opposite to pole piece 4. Pole pieces 1 and 2 are mounted on the drive shaft which is inserted through the center holes of the pole pieces. Pole pieces 3 and 4 are also fastened on the drive shaft, such as by means of a hub.

The walls of the annular or cylindrical pole pieces 3 and 4 are shaped to include projecting jaws 7 and 8 (FIGS. 1, 1a) which form intermediate recesses. When the pole pieces 3 and 4 are assembled with a central supporting disc 5, the recesses are bordered by the rim 6 of the disc so that they assume the shape of windows 9 and 10. For the purpose of securing the rotor against the effect of centrifugal forces, the rim 6 has a peripheral flange engaged by and firmly joined with the jaws 7 and 8, for example by means of lateral stops and/or by welding, soldering or the like.

The north and south pole pieces of the rotor are made of highly permeable magnetic material. The center disc 5 for reinforcing the rotor against centrifugal forces must be made of non-magnetic material to avoid a magnetic short circuit between the poles. By virtue of this construction the greater part of the centrifugal forces effective upon the annular pole pieces or upon any added permanent magnets is counterbalanced in a mechanically favorable manner, mainly at the center of the rotor. Since reinforcing bolts are not needed such permanent magnets can be readily interposed between the hub portions 1a and 2a of the pole pieces 1, 2 and the jaws 7 and 8 of the pole pieces 3 and 4 (FIG. 3a). The subdivision of the magnet systems further facilitates additionally fastening the cylindrically annular pole pieces to the drive shaft at the axially opposite ends, thus further reinforcing the rotor structure against centrifugal forces, such a modification being shown in FIG. 2 and more fully described presently.

FIG. 2 in conjunction with FIGS. 2a and 2b shows a rim-supporting member 11 concentrically situated with respect to the annular member 4. The supporting member 11 forms a disc with arms extending between the projecting jaws. The supporting member for the pole piece 3 is identical to that of 4. The spider-shaped member 11 is made of non-magnetic material and has a center hole seated on the drive shaft or hub. The arms of member 11 are also secured to the outer edges which form window sides between the projecting jaws of the annular pole pieces. The arms are fastened to these outer edges, for example by welding or soldering at 12. The arms of the supporting member 11 may also have a shoulder 13 against which the corresponding outer edge of the pole piece 4 is seated, a structural bond between the arms and the outer edges of the pole piece being provided by welding, soldering or other radially rigid fastening means.

Another embodiment of joining the supporting member 11 to the outer edges of the annular pole pieces, is shown in FIG. 2b. In this configuration, the arms of member 11 have a hook-shaped end 14 which overlaps with the outer edges of the annular pole pieces. Welded or soldered joints are applied to secure the arms firmly to the outer edges of these pole pieces. Any other structural support extending radially from the shaft to the outer edges of the pole pieces may also be provided to brace these edges against centrifugal forces. At the same time, the annular pole pieces may be provided with one or more ribs 15 at their peripheries for increasing the rigidity of these members.

The provision of the supporting members 11 does not result in increasing the length of the rotor assembly in the axial direction. Since the edge-supporting members serve only to additionally brace the rotor assembly, they may be dimensioned essentially for withstanding the required mechanical stresses. Consequently, the spider-shaped members 11 may be given a relatively small wall thickness, particularly if they are made of non-magnetic steel.

In the embodiment of FIG. 3, the rim-supporting member 11 and the center-supporting member 5' are both spider-shaped, only one of the members 11 being shown. This spider design results in considerable weight savings without sacrificing mechanical strength and rigidity, because the spider arms support those locations of the annular pole pieces that are most susceptible to deformation due to centrifugal forces.

Further weight savings may be realized if the spider-shaped pole pieces are not of entirely massive material throughout. For example, they may be given a number of holes or bores 16 distributed about the axis. The arrangement and size of the holes are so chosen as to avoid appreciably reducing the mechanical strength or significantly increasing the magnetic resistances.

The rim of the central supporting member 5' is provided with a flange 6' similar to that described in relation to FIG. 1. The flange is firmly secured to the corresponding outer edges of the annular pole pieces of which only the pole piece 4 is shown in FIG. 3. The flanges and the edges of the pole pieces which they support, are shaped so as to correspond to each other's contour.

A design of the spider-shaped pole pieces 1 and 2 according to FIG. 3 is especially well suitable for the insertion of prismatic permanent magnets 27 between the magnet pole systems 1 and 2 on the one hand and the appertaining cylindrically annular systems, such as system 4 in FIG. 3, on the other hand. Preferably used are permanent magnets made of a material having high coercive force and a substantially linear relationship of induction versus magnetic field strength in the second quadrant. A material of this type, for example, is strontium ferrite.

By including such permanent magnets into the rotor assembly, the excitation winding of the synchronous machine can be made smaller and auxiliary excitation devices can be avoided.

A rotor of the latter type is illustrated in FIG. 3a in fully assembled condition, except that the one edge-supporting member located at the axial end facing the observer is omitted in order to reveal the interior; it being understood that the omitted edge-supporting member will be seated on the drive shaft 28 of the motor when the illustrated rotor is in operating condition.

To improve the magnetic characteristics of the outer edges of the jaws 7 and 8 on the annular pole pieces 3 and 4, respectively, these outer edges are provided with pockets or grooves 17 and 18. The pockets are shaped to conform to the flanged rim 19 of the central supporting member 5 or 5'. The outer sides 20 and 21 of the pockets extend over the inner sides 22 and 23, respectively, so that when the rotor is assembled, only a small gap 24 remains at the circumference. This gap may be closed by welding or soldering. In this particular embodiment a full support against centrifugal effects upon the joint between the central supporting member and the annular pole pieces is realized without the necessity of soldering or welding respective parts consisting of dissimilar materials.

Another embodiment for supporting the outer edges of the jaws 7 and 8 of the annular pole pieces 3 and 4, respectively, is shown in FIG. 5. The outer edges of the jaws 7 and 8 are shaped so as to include a pocket 26 at their underside. The supporting member 11, on the other hand, forms a right-angle hook 25 for insertion into the pocket. Since in this embodiment the rim-supporting member 11 is joined to the jaws of the annular pole pieces, deformation of the rotor, while in motion, is avoided without resorting to additional expedients. If desired, the joints between the supporting member 11 and the jaws of the pole pieces, may be secured by soldering or welding.

The rim-supporting members illustrated in FIGS. 2, 3 and 5 may also be constructed in the form of discs conforming to the internal diameter of the annular pole piece and situated within the cylindrical portion of the pole piece. As a result of supporting the annular pole pieces with respect to the drive shaft in this manner, the rotor is not subjected to significant deformation or deflection when rotating at high speeds. Hence the auxiliary air gaps between the exterior surface of the rotor and the stator winding surrounding the rotor can be minimized. Such a decrease in gap width affords reducing the size of the excitation coil so that the overall weight of the machine is also reduced.

Since by virtue of the invention the circular cross section of the rotor is braced and preserved, the additional eddy currents in the rims, which otherwise result from non-uniform distribution of the magnetic induction, are virtually prevented. Preferably the supporting members are designed as structures of uniform strength distribution with a view to optimize weight without sacrifice of mechanical strength or rigidity. In the event the machine is to be especially light in weight, the supporting members are preferably made of materials having particularly great strength relative to their weight, for example, of titanium or titanium alloys. Otherwise the supporting members may be made of weldable non-magnetic steel, for example.

To those skilled in the art, it will be obvious from a study of this disclosure, that our invention permits of various modifications with respect to construction, materials, and arrangements and hence can be given embodiments other than particulalry illustrated and described herein, without departing from the essential features of our invention and within the scope of the claims annexed hereto.

We claim:
1. An alternating pole, winding-free annular rotor for a synchronous machine having oppositely excited stationary excitation windings, said rotor comprising
 a magnetically conductive shaft having an axis;
 a winding-free first magnetic pole system of substantially cylindrical configuration positioned around said shaft and having windows formed through the cylindrical surface thereof;
 a winding-free second magnetic pole system extending radially relative to said first magnetic pole system securely torsion-resistantly affixed to said shaft and extending into the windows of said first magnetic pole system; and
 a radially extending non-magnetic carrier torsion-resistantly affixed to said shaft perpendicularly thereto, said carrier having an edge, each of said first and second magnetic pole systems comprising two partial systems specularly positioned relative to said carrier, each of the two partial systems of said first magnetic pole system having axially aligned arms adjacent the windows of said first magnetic pole system, said arms being boltlessly and centrifugal force-resistantly affixed to the edge of said carrier and to each other.

2. A rotor as claimed in claim 1, wherein the edge of said carrier has axial protrusions formed therein and the arms of the partial systems of said first magnetic pole systems have corresponding depressions formed therein, and wherein the protrusions of said carrier are seated in the depressions of said arms.

3. A rotor as claimed in claim 1, further comprising additional radially extending non-magnetic carriers torsion-resistantly affixed to said shaft on both sides of said second magnetic pole system, each of said additional carriers having an edge, the arms of the partial systems of said first magnetic pole system being centrifugal force-resistantly affixed to the edges of said additional carriers.

4. A rotor as claimed in claim 1, wherein said carrier is shaped as a spider.

5. A rotor as claimed in claim 1, further comprising a plurality of permanent magnets mounted between the poles of said second magnetic pole system.

6. A rotor as claimed in claim 3, wherein the edge of each of said additional carriers has axial protrusions formed therein and the arms of the partial systems of said first magnetic pole system have corresponding depressions formed therein, and wherein the protrusions of said additional carriers are seated in the depressions of said arms.

7. A rotor as claimed in claim 5, wherein said permanent magnets are of solid prismatic shape.

8. A rotor as claimed in claim 5, wherein said permanent magnets comprise material having high coercive force and a substantially linear dependence of magnetic induction upon field strength.

9. A rotor as claimed in claim 5, wherein said perment magnets comprise strontium ferrite.

10. A rotor as claimed in claim 6, wherein said carrier and said additional carriers comprise titanium or titanium alloy.

11. A rotor as claimed in claim 6, wherein said carrier and said additional carriers are shaped as bodies of uniform strength distribution.

12. A rotor as claimed in claim 6, wherein each of said additional carriers is shaped as a spider.

References Cited

UNITED STATES PATENTS

| 2,386,673 | 10/1945 | Fisher | 310—214 |
| 2,691,113 | 10/1954 | Ordas | 310—194 |
| 2,872,605 | 2/1959 | Moore | 310—194 |
| 3,062,692 | 11/1962 | Manganello | 310—194 |
| 3,206,629 | 9/1965 | Jensen | 310—162 |

FOREIGN PATENTS 1,365,513   4/1964   France.

MILTON O. HIRSHFIELD, Primary Examiner

ALFRED G. COLLINS, Assistant Examiner

U.S. Cl. X.R.

310—262